United States Patent [19]
Chevrel et al.

[11] Patent Number: 5,368,223
[45] Date of Patent: Nov. 29, 1994

[54] PIPE WELDING PROCESS USING A METALLIC INSERT FOR IMPROVED CORROSION RESISTANCE OF THE WELDED ZONE

[75] Inventors: Henri Chevrel, Tsukuba; Alain Boireau, Minato, both of Japan

[73] Assignee: L'Air Liquide, Societe Anonyme Pour L'Etude Et L'Exploitation Des Procedes Georges Claude, Paris, France

[21] Appl. No.: 57,579

[22] Filed: May 6, 1993

[51] Int. Cl.$^5$ .................................................. B23K 9/02
[52] U.S. Cl. .................. 228/214; 228/262.41; 428/685; 219/106
[58] Field of Search ................ 228/214, 262.3, 262.41, 228/262.71; 428/660, 685; 219/106, 121.14

[56] References Cited

U.S. PATENT DOCUMENTS

| | | | |
|---|---|---|---|
| 385,384 | 7/1888 | Thomson | 219/106 |
| 2,850,798 | 9/1958 | Bowman et al. | 428/660 |

FOREIGN PATENT DOCUMENTS

| | | | |
|---|---|---|---|
| 56-136981 | 10/1981 | Japan | 228/214 |
| 60-61185 | 4/1985 | Japan | 228/262.41 |
| 797023 | 6/1958 | United Kingdom | 428/660 |

OTHER PUBLICATIONS

"Arc Welding of Stainless Steel", *Metals Handbook*, 8th Edition, vol. 6, Aug. 1971, pp. 251-2.

*Primary Examiner*—P. Austin Bradley
*Assistant Examiner*—Jeffrey T. Knapp
*Attorney, Agent, or Firm*—Malcolm B. Wittenberg

[57] ABSTRACT

Avoidance of the corrosion initiation sites consisting of Mn particles deposited on the TiG welded inner tube surface is achieved through suppression of emission of manganese fumes by addition of a protective non corrosive metallic layer. The latter melts during the welding and arises in a non-corrosive internal metallic coating of the welded zone.

11 Claims, 2 Drawing Sheets

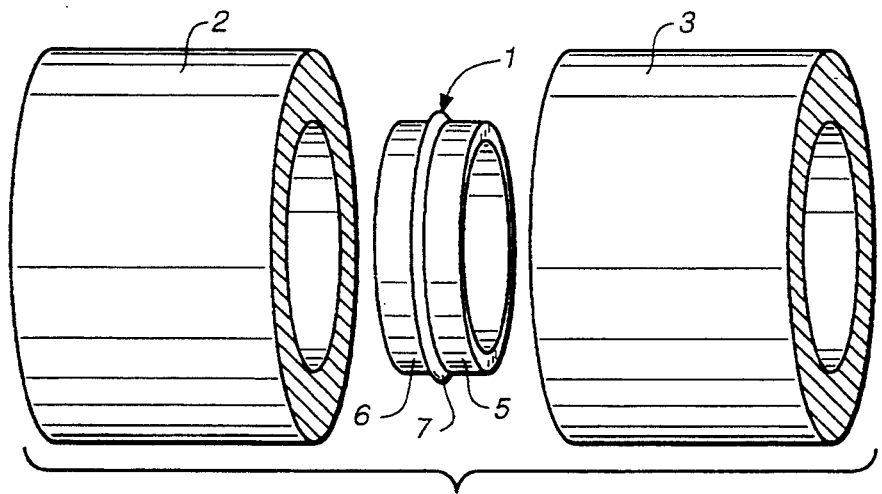
FIG._1A
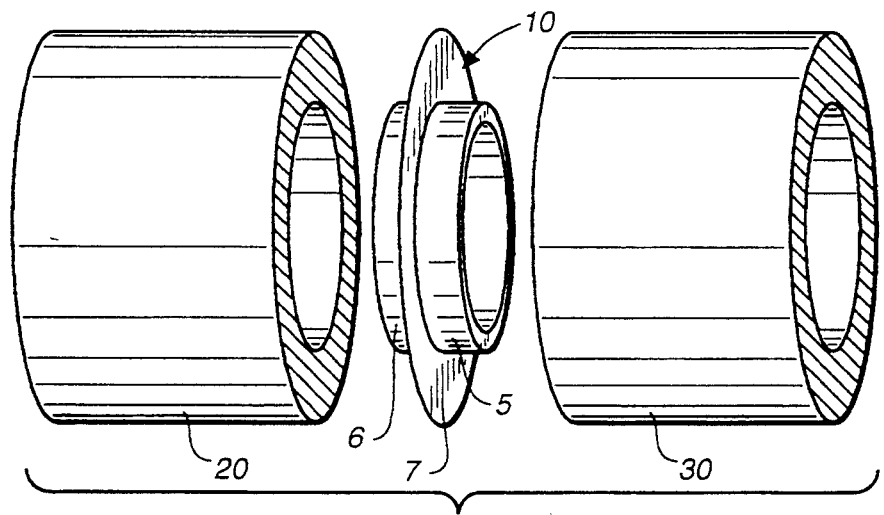
FIG._1B
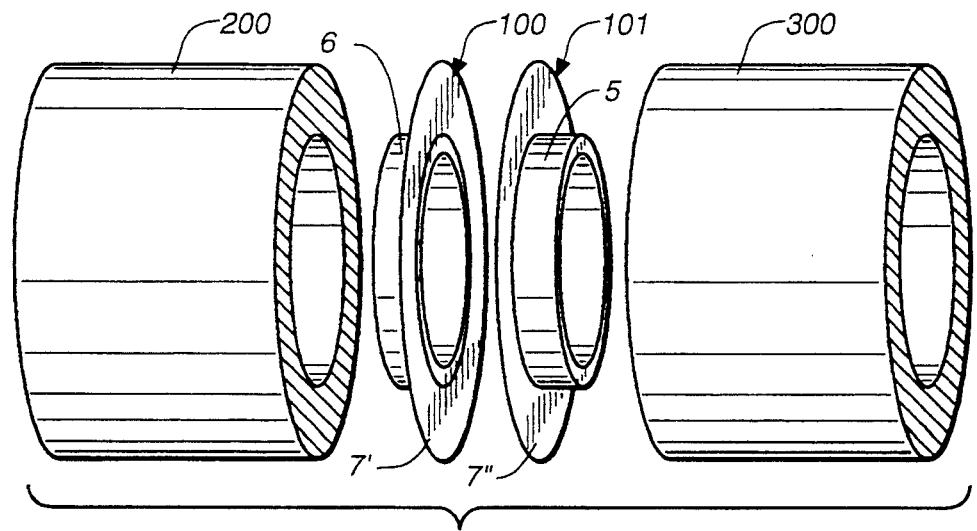
FIG._1C

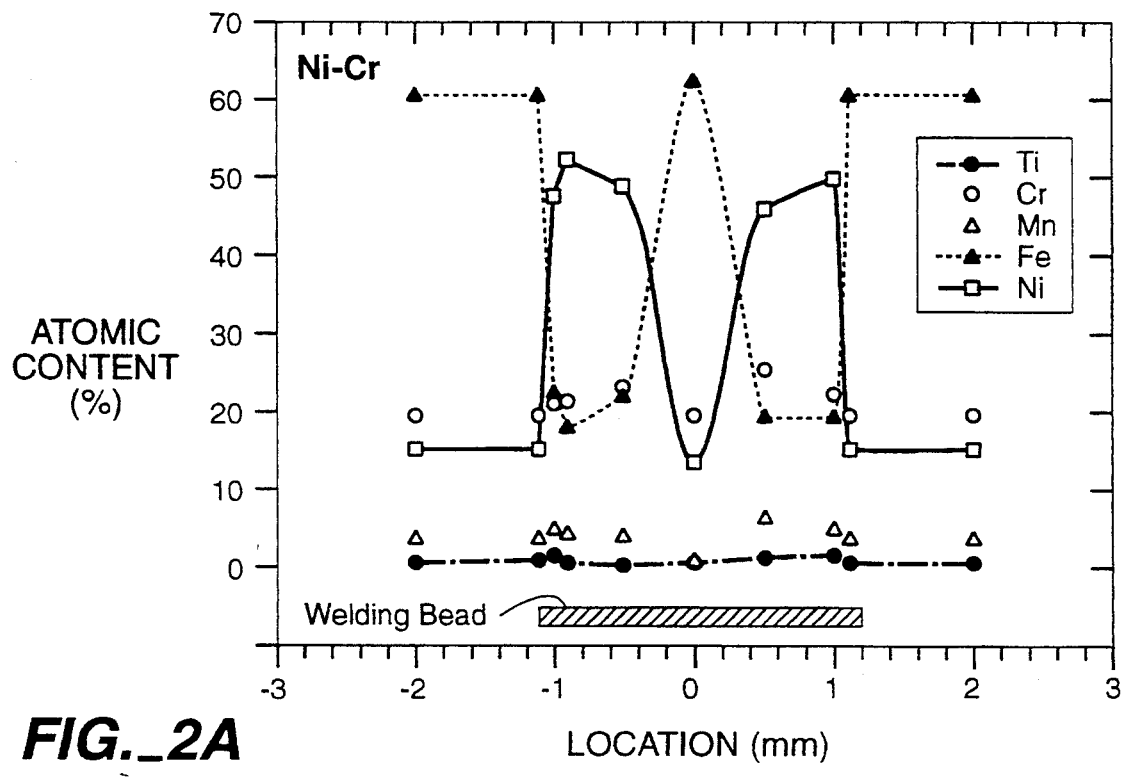
FIG._2A
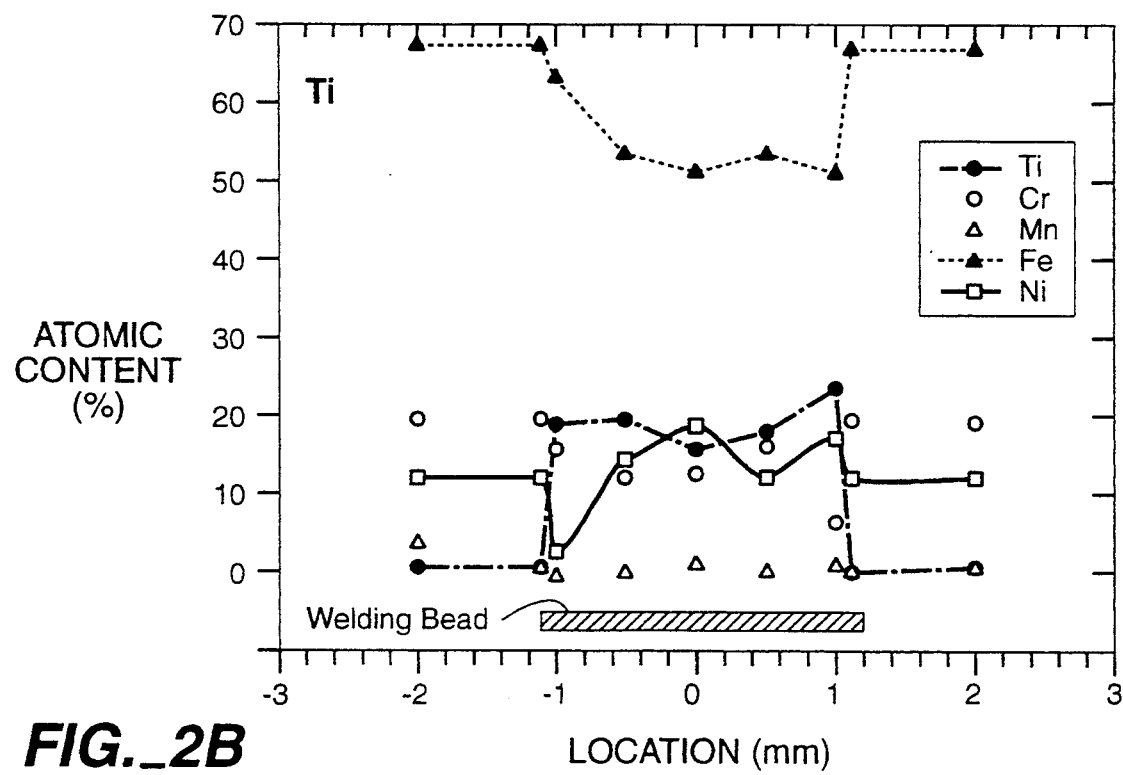
FIG._2B

PIPE WELDING PROCESS USING A METALLIC INSERT FOR IMPROVED CORROSION RESISTANCE OF THE WELDED ZONE

BACKGROUND OF THE INVENTION

High purity gas delivery systems, particularly those transporting gases such as HCl, HBr, etc., which are used in the wafer fab, are usually made of 316 L stainless steel tubings of approximate elemental composition 18% chromium, 12% nickel, 2.5% molybdenum, and 2-3% of manganese. 316 L Stainless steel displays improved corrosion resistance in comparison to other steels as a consequence of low content of carbon which avoids the precipitation of chromium carbide at grain boundaries. This kind of tubing receives also surface treatments such as electropolishing which improve corrosion resistance and other required properties.

However, stainless steel comprising a low content of carbon and being further surface treated loses its corrosion resistance properties during welding as disclosed by H. H. Uhlig & R. W. Revie in "Corrosion and Corrosion Control", by John Wiley & Sons Third Ed (1985). This arises from two main reasons: the first reason is the destruction of the passivated steel surface, and the second reason is the formation of heat affected zone, modifying the bulk properties of the stainless steel.

Moreover, a corrosion sensitization of the zone surrounding the welded area appears as a consequence of the emission of manganese fumes (due to manganese high partial pressure) during the melting of the bead and deposition of manganese particles on the inner surface, wherein up to 50% of the inner surface of the tubing at 5 mm downstream the welding is covered by manganese particles. These manganese fumes act as specific corrosion initiators in corrosive gas environment as disclosed e.g. by S. Miyoshi, A. Ohki, K. Kawada, M. Nakamura, T. Watanabe, S. Takahashi and T. Ohmi, in the article entitled "Ultra Clean Welding Technology without Accompanying Corrosion", in 18th workshop on Ultra Clean Technology, Ultra Clean Society, Tokyo, p. 204 (1992). Usually, manganese fumes are produced by the molten metal during welding. The fumes are present on both sides of the tube. On the inner side of the tube the inert gas which flows through the tube during said welding entails the deposition of manganese particles downstream the welding place, which later on creates corrosion spots by interaction with the corrosive gases such as HCl, HBr, etc.

It has been also proposed to improve corrosion resistance of the welding bead by adding a corrosion resistant metal in the bead in the form of a wire or an electrode as disclosed e.g. in Japanese Patent application 78/040656 entitled "Core wire for welding rod for welding stainless steel-consist of austenite and ferrite phases", or in Japanese Patent application 82/013399 entitled "Core wire for welding rod for welding stainless steel—consist of austenite and ferrite phases".

A similar improvement using a coating process has been disclosed in Japanese Patent application 78/018444 entitled "Welding process for stainless steel pipes or plates—having surface layer of chromium and nickel, with deposition of corrosion resistant layer on weld zone". The coatings are either deposited before the welding (coated tubes) or after.

In the case of small diameter tubings e.g. ⅛ inch, ¼ inch or even larger diameter, the welding technique required for a strong and smooth joining is usually TIG or Tungsten Inert Gas welding, involving a non-melting electrode. Therefore, the techniques disclosed hereabove cannot be applied.

SUMMARY OF THE INVENTION

It is the object of the invention to avoid the formation of corrosion initiation sites during welding of stainless steel tubings. It is another object of the invention to suppress the emission of manganese fumes during welding of tubings containing manganese.

These and other objects are achieved with the present invention, wherein the formation of corrosion initiation sites consisting of Mn particles deposited on the inner tube surface is avoided through suppression of emission of manganese fumes by addition of a protective non corrosive metallic layer on the tube's surface. The latter melts during the welding and arises in a non-corrosive internal metallic coating of the welded zone.

DESCRIPTION OF THE DRAWINGS

FIG. 1A, B and C shows various welding inserts for tubing made of corrosion resistant metals.

FIG. 2A and B are an EDAX profile of welding beads with a nickel-chromium insert (FIG. 2A) and with a titanium insert (FIG. 2B).

DETAILED DESCRIPTION OF THE INVENTION

The invention relates to a process for welding two tubings, providing an improved corrosion resistance of the welded zone against corrosive fluids, to be used for contamination free handling of ultra high purity fluids, said pipe being made of stainless steel comprising manganese, wherein said process comprises the steps of providing an insert body made of manganese poor corrosion resistant metal, introducing said insert body partially into the end of each tubing to be welded, preferably in such a way that the two tubes are in contact with the ring part of the insert body before welding said pipes in order to provide an internal layer of corrosion resistant material between the two tubings and reduce the manganese fumes emission from the stainless steel tubes to be welded.

During the welding process, the insert ring makes an alloy at the inner surface of the tube, thus preventing manganese vapor emissions, because the molten metal does not comprise manganese. In order to keep a finishing metal concentration, such as Ni or Cr which is sufficient at the surface of the seam, the viscosity of this molten alloy must be preferably greater than that of the steel of the tubings. Consequently, the melting point of the insert body alloy is slightly greater than that of the tubing steel, giving a greater surface viscosity.

The improved corrosion resistance of the welding bead and surrounding zone is preferably realized by the prevention of manganese fumes emission from the melted bead zone, and by the enhancement of the concentration of corrosion resistant metal at the welding region. This can be, for example, achieved by addition of a metal insert made of a section of cylinder attached to a ring, both made of manganese-poor and corrosion resistant metals such as Ti, Cr, Ni, V, Zr, or their alloys, as exemplified on FIG. 1A, 1B and 1C. On these figures, the inserts in one piece are 1 or 10, those in two pieces are 100 and 101—preferably similar to each other. These inserts are placed in the tubes 2, 20, 200 respectively 3, 30, 300.

Usually, the insert is placed at the junction of the tubings to be welded, and inside of the tubings. The cylindrical portion 5, 6 of the insert suppresses emission of manganese fumes and increases the concentration of protective metal (Cr, Ni, or an alloy of nickel and chromium, etc.) on the welding bead surface after the welding, thus making it more corrosion resistant than conventional welded tubes and than the pipe itself.

The ring part (7, 7', 7") of the insert has two functions: one is to set the insert ring in the correct position before welding and the second is to enrich the melted bead in corrosion resistant metal.

The insert is set prior to the welding of piping as shown on FIG. 2. The welding conditions are essentially the same as those requested for the BUTT type of joining of tubings. The insert will melt during the welding, therefore increasing the concentration of the metal composing the insert, in the welded zone.

The insert ring is made of substantially manganese free alloys with comparable or slightly lower or higher melting point than the stainless steel used. For example, nickel-chromium alloy or pure nickel, pure chromium or titanium, or vanadium or zirconium or an alloy containing more than 20% of one of them are adequate. The insert is shaped as either a section of a cylinder whose outside diameter is equal to the inside diameter of the pipe to be welded, and having a thickness between about 10 $\mu$m to about 20 $\mu$m, or it includes an additional ring made of the same metal as above, i.e., either nickel-chromium alloy or nickel, titanium or vanadium, with low manganese concentration.

This last shape of the insert allows an easy positioning of the insert ring and additionally enhances the concentration of the corrosion resistant metal in the welding bead. This ring 7, 7', 7", is positioned at substantially half distance of the ends of the cylinder 5, 6 as exemplified on FIG. 1A and 1B, or at one end of the cylinders 5, 6 as exemplified on FIG. 1C by 7' and 7". The ring can be made from a wire of the same metal as shown on the figure, from a foil thicker than 20 $\mu$m or just a form in the cylinder, in such a way that during introduction in the cylinder the insert can be blocked at its right position.

(The insert can be made of one or two parts as exemplified on the figures. When it is made of two parts, they are preferably similar, but they might be different.)

The insert length should be equal to or longer than the bead width so that the insert metal is alloyed with the surface metal during TiG (Tungsten Insert Gas) welding.

The shielding gas used during the welding is either argon, helium or a mixture of hydrogen diluted in argon or in helium.

EXAMPLE

One-quarter inch 316 L electropolished tubings have been welded using 5% $H_2$ in argon. The TIG welding conditions are listed in the Table 1. Samples were welded (I type joining) without and with insert made of nickel-chromium alloy. The example of insert are presented in the FIG. 1.

After welding the composition of the surface has been checked by EDS (FIG. 2). The results show that the insert elemental composition is retained on the welding bead surface. The composition of the surface is independent of the insert type (FIG. 1A, B, C). No manganese particles are detected outside the welding bead.

At the exact location of the bead, the composition changes for all the insert types. The insert metal concentration decreases and the iron content increases. This is due to the convection in the melted metal during the welding.

The corrosion resistance of the welded area has been tested by dipping various welded tubings into a 3.3% $FeCl_3$/5.7N HCl etching solution.

The electropolished 316 L tubing exhibits a severe corrosion after 4 hours exposure to the etching solution while the welding bead protected with the insert remained uncorroded even after 4 hours of exposure.

Dry corrosion experiments have been performed with HBr (Assay 47%) solution vapor. No corrosion has been detected even after 8 hours of exposure.

To carry out the above example, the following welding parameters summarized in Table 1 have been used:

TABLE 1

| Welding parameters | |
|---|---|
| Welding system | Cajon 100 DJR TIG |
| Pulse welding (frequency) | 0 Hz |
| Electrode | W |
| Electrode tubing gap | 0.875 mm |
| Current impulse height | 20.5 A |
| Lower current maintenance | 20.5 A |
| Duty cycle | 50% |
| Start current | 50 A |
| Duration | 0.15 s |
| Purge gas | Ar |
| Prepurge | 10 s |
| Dwell time | 20 s |
| Down slope time | 4 s |
| Postpurge time | 20 s |
| Max. speed | 50% |

We claim:

1. A process to improve corrosion resistance of a welded bead area created by the welding of two tubings by providing an improved corrosion resistance of the welded zone against corrosive fluids, said tubings being made of stainless steel comprising manganese, wherein said process comprises the steps of providing an insert body made of manganese poor corrosion resistant metal, introducing said insert body partially into the end of each tubing to be welded and welding said tubings in order to provide an internal layer of corrosion resistant material between the two tubings and reduce the manganese fumes emission from the stainless steel tubes to be welded.

2. A process according to claim 1, wherein said insert body is a section of a cylinder comprising an outer ring.

3. A process according to claim 1, wherein said insert body is a section of a cylinder comprising an outer disk concentrically formed around the said section of cylinder.

4. A process according to claim 1, wherein said insert body comprises two cylinders with an outer ring concentrically formed around said section of said cylinder, at one end of said cylinder.

5. A process according to claim 1 wherein said insert body is made of a corrosion resistant metal selected from the group comprising titanium, chrome, nickel, vanadium, zirconium or their alloys.

6. A process according to claim 1, wherein the insert body comprises a cylindrical portion having a thickness between 10 $\mu$m to 20 $\mu$m.

7. A process according to claim 1, wherein the insert body comprises a cylindrical portion having an outside diameter which is about equal to the inside diameter of the smallest inside diameter of the pipes to be welded together.

8. A process according to claim 1, wherein the insert body comprises a metal selected from the group consisting of nickel-chrome alloy, nickel, chrome, titanium, vanadium, zirconium or an alloy containing more than 20% by weight of one of those metal or alloys.

9. A process according to claim 1, wherein Tungsten Inert Gas (TIG) welding is used.

10. A process according to claim 1, wherein the welding process takes place under an inert gas atmosphere.

11. A process according to claim 6, wherein the inert atmosphere comprises a gas selected from the group consisting of argon, helium, hydrogen or their mixtures.

* * * * *